United States Patent [19]

Toshima

[11] Patent Number: 4,785,962
[45] Date of Patent: Nov. 22, 1988

[54] VACUUM CHAMBER SLIT VALVE

[75] Inventor: Masato Toshima, Campbell, Calif.

[73] Assignee: Applied Materials, Inc., Santa Clara, Calif.

[21] Appl. No.: 40,287

[22] Filed: Apr. 20, 1987

[51] Int. Cl.$^4$ ............................................. B65D 43/14
[52] U.S. Cl. ..................................... 220/260; 220/263; 220/264
[58] Field of Search ................. 220/260, 263, 264, 334

[56] References Cited

U.S. PATENT DOCUMENTS 4,655,362  4/1987  Ecker et al. ........................ 220/260
4,673,101  6/1987  Guarino et al. .................... 220/260

Primary Examiner—George T. Hall
Attorney, Agent, or Firm—Flehr, Hohbach, Test, Albritton & Herbert

[57] ABSTRACT

A slit valve for sealing an access opening in a vacuum chamber. The slit valve body or door is pivotally mounted adjacent the opening and has a pair of cam blocks mounted at its opposite ends. Cam follower rollers are mounted on a swing arm for reversible pivotal door opening and closing movement effected by a pneumatic cylinder. During closing movement of the swing arm, the cam followers engage the cam block and resiliently pivot the slit valve against the opening. Upon reversed, pivotal opening movement, the cam followers release from the cam block, allowing a spring to return the door to a normally opened position. The slit valve mounting is adapted to provide equal compressive sealing, both top-to-bottom and side-to-side.

11 Claims, 2 Drawing Sheets

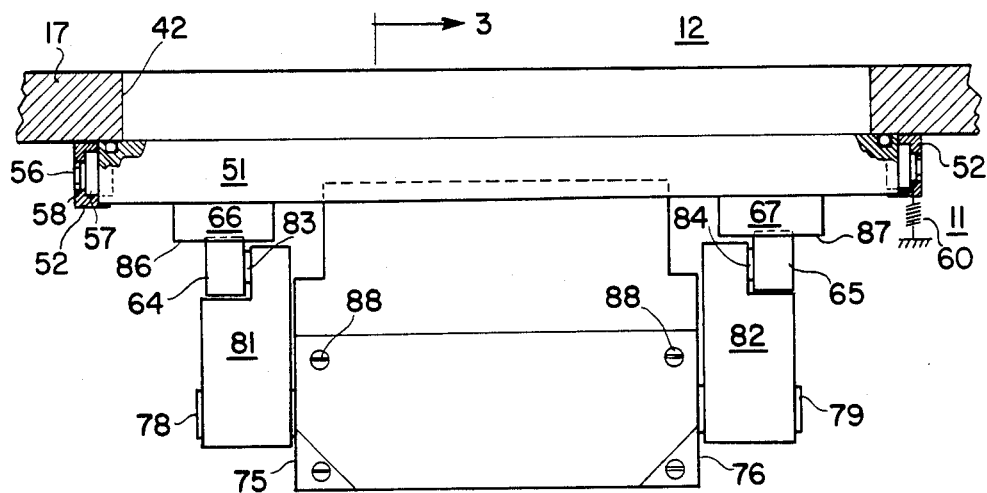
FIG. 2
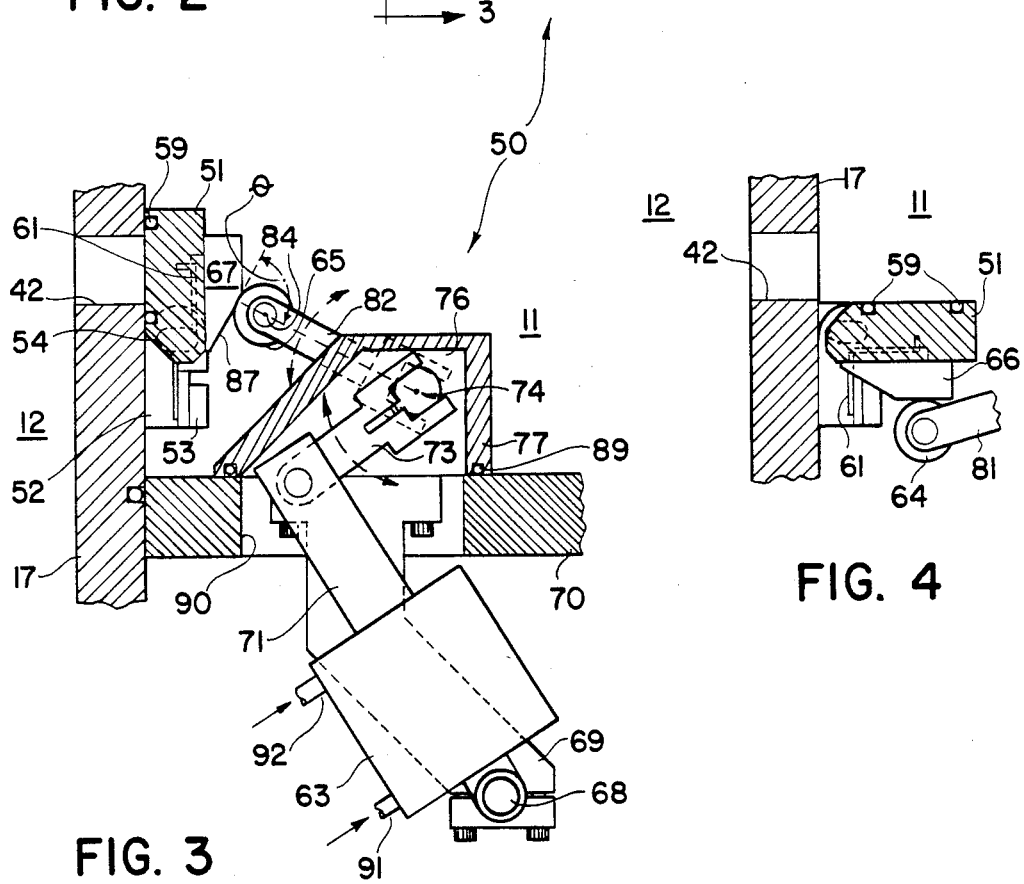
FIG. 3
FIG. 4

VACUUM CHAMBER SLIT VALVE

BACKGROUND OF THE INVENTION

The present invention relates to a slit valve closure useful, for example, in vacuum, semiconductor fabrication equipment.

During vacuum processing, the access openings to semiconductor vacuum fabrication chambers are closed and sealed by sliding or pivoting doors or closures. The closures may be operated (opened and closed) using various means such as, for example, pneumatic cylinders.

Compactness, high reliability and low cost are given requirements or disiderata of such closure mechanisms. With the increasing use of in-vacuum wafer-handling loadlock chamber which interface with an adjacent vacuum processing chamber for automatically loading wafers into the processing chamber and retrieving wafers from the chamber in vacuum, these requirements have become even more important, because the closure may be interposed between the loadlock chamber and the vacuum processing chamber and, in fact, may be located in the loadlock chamber. Quite obviously, when the closure is located in the loadlock it is highly desirable to minimize both its physical size and the space required for its opening/closing operation. This is true, particularly if the loadlock serves a multiple number of process chambers and, therefore, incorporates a number of closures. Of course, the use of multiple doors or closures increases the desirability of low unit cost. Furthermore, the high throughput goals of processing chambers (both single and multiple chamber systems) which use an automatic wafer-handling loadlock chamber require reliable closure operation.

Finally, but not exhaustively, particulates generated when even a single door or closure is located and operated within a vacuum loadlock chamber can have a drastic adverse impact on the operability of integrated circuits processed within the associated IC vacuum fabrication chamber (or within the loadlock chamber itself). As is well known in the industry, as the minimum feature sizes of integrated circuits are scaled downward from LSI (large scale integrated circuits) to VLSI (very large scale integrated circuits) and to even smaller sizes, the circuits become increasingly susceptible to damage by particulates.

SUMMARY OF THE INVENTION

In view of the above discussion, it is an object of the present invention to provide a compact wafer entrance slit and slit closure valve mechanism for a vacuum chamber.

It is another related object to provide such a slit valve mechanism which is slightly reliable and of low unit cost.

It is also an object to provide such a slit valve whose operation is characterized by low particulate generation.

It is another, related object to provide a slit valve which provides compensated, uniform top-to-bottom and left-to-right sealing action.

In one aspect, a slit valve embodying my present invention, which meets the above and other objectives, comprises: bracket means preferably including a pair of brackets mounted adjacent and on opposite sides of an opening in a vacuum chamber wall, the brackets rotatably mounting a shaft with its axis generally parallel to the opening; a slit valve body mounted on the shaft to pivotal movement therewith to open and close the opening, the slit valve body having a sealing member mounted therein facing the wall for forming a seal between the wall and body about the periphery of the opening; biasing means operatively connected to the slit valve body for biasing the body to a normally open pivotal position; and means for closing the slit valve body over the opening comprising at least one cam block mounted on the side of the body opposite the wall and having a camming surface, a rotatable shaft, a swing arm mounted on the shaft for rotation therewith and carrying an eccentric cam follower on the end thereof opposite the shaft, and actuator means for reciprocally rotating the shaft and the cam follower in first and second directions for engaging the cam block camming surface during movement in the first direction to cam the slit valve body closed and for releasing from the cam block during movement in the second direction to permit the biasing means to pivot open the slit valve body.

Preferably, the brackets have an elongated slot therein oriented transverse to the plane of the chamber wall for rotatably mounting the slit valve shaft, and the slit valve mechanism includes spring means biasing the slit valve body toward the outside end of the slot. As a consequence, pivotal closing movement of the cam follower in the first direction overcomes the biasing of the spring and resiliently move the slit valve body linearly inwardly along the slot and against said wall. The eccentered cam follower and linear valve body movement provide even compressive sealing by the valve body, both top-to-bottom and side-to-side.

BRIEF DESCRIPTION OF THE DRAWINGS

The above and other aspects of the present invention are described in conjunction with the included drawings, in which:

FIG. 2 is a top plan view of a slit valve which is a presently preferred embodiment of my present invention, shown in use in the vacuum processing system of FIG. 1;

FIG. 3 is a vertical cross-section taken along lines 3—3 in FIG. 2 showing the slit valve in a closed position; and FIG. 4 is a partial vertical cross-sectional view showing the slit valve in the open position.

DETAILED DESCRIPTION

1. Exemplary Applicable Processing System

Figure 1:
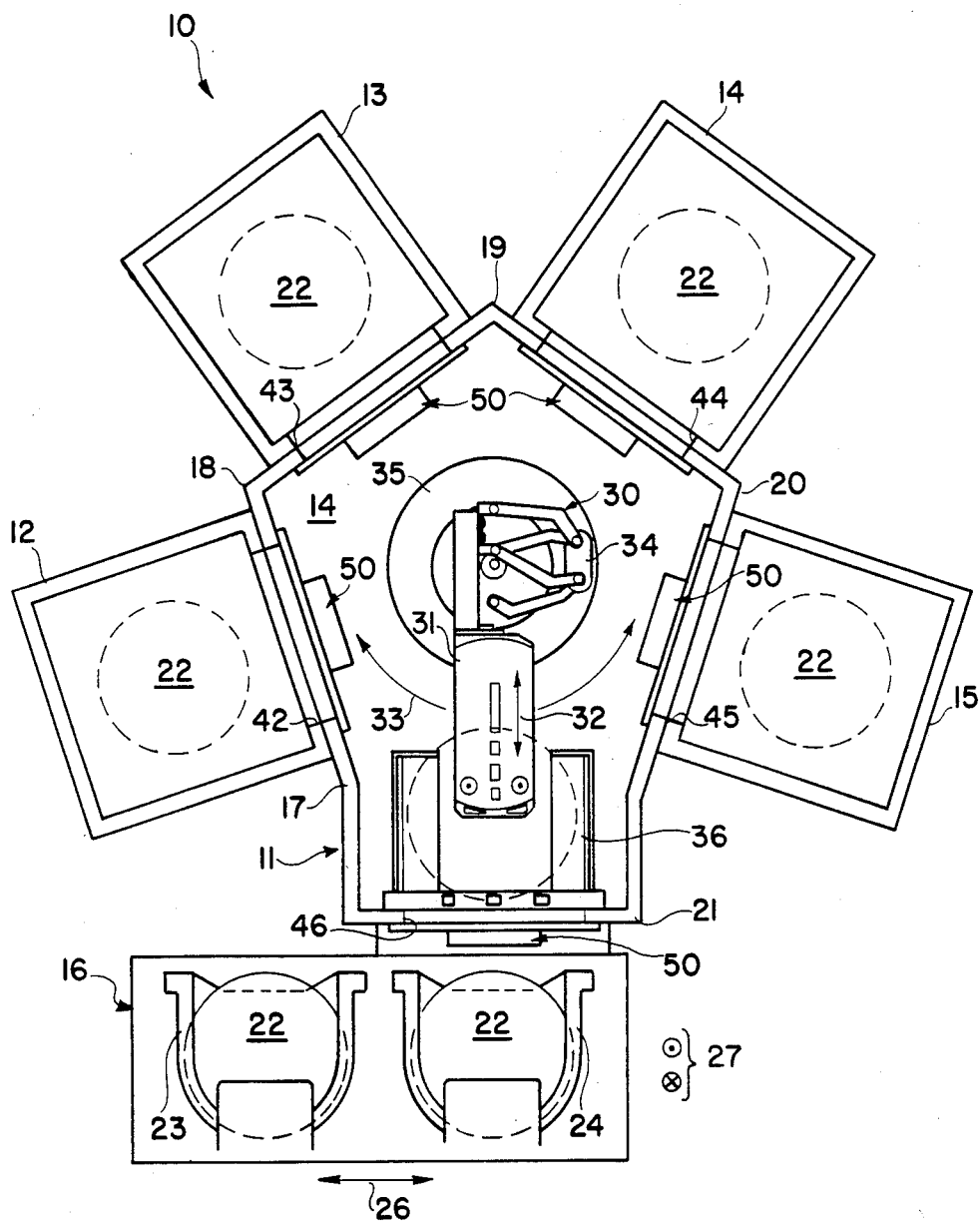
FIG. 1 is a simplified top plan view of a multiple chamber vacuum processing system for integrated circuits which incorporates a multiplicity of slit valves.

FIG. 1 is a top plan view of a multiple chamber integrated circuit processing system 10 of the type which benefits from the use of my small, fail-safe particulate-free slit valve. The multiple chamber processing system 10 is described in detail in co-pending, commonly assigned, U.S. patent application Ser. No. 944,803, entitled MULTI-CHAMBER INTEGRATED PROCESS SYSTEM, filed Dec. 19, 1986, in the name of MAYDAN ET AL, which application is hereby incorporated by reference in its entirety.

Illustratively, the multiple chamber system 10 comprises an enclosed, generally polygonal-shaped vacuum loadlock chamber 11 which mounts several single-wafer, vacuum processing chambers 12, 13, 14 and 15 on associated loadlock chamber walls 17, 18, 19 and 20 for processing wafers 22—22 initially contained in standard plastic cassettes 23 and 24. The cassettes are mounted on an external cassette elevator 16 positioned adjacent the fifth chamber wall 21. As indicated by arrows 26 and 27, the external cassette elevator 16 is movable, is indexable, horizontally and vertically to position the cassetes for loading unprocessed wafers into the loadlock chamber 11 and for receiving process wafers from the chamber.

The wafer loading and unloading is done by a robot 30 comprising a wafer transfer blade 31 which is mounted for reversible linear translation indicated by arrow 32 (R movement) and reversible rotation indicated by arrow 33 ($\theta$ movement). Specifically, a four-bar link mechanism 34 imparts R movement while $\theta$ movement is provided by a rotatable platform 35 which mounts the four-bar link mechanism 34 and the wafer support blade 31.

A vertically indexable internal wafer support elevator 36 is used to store wafers within the loadlock chamber 11 for transfer to the various processing chambers 12–15 without breaking vacuum in the system and for processing in the loadlock chamber 11 itself.

Referring still further to FIG. 1, small elongated slits or slots 42–46 are formed in the respective chamber walls 17–21 for providing mutual access between the processing chambers 12–15 and the loadlock chamber 11 and between the loadlock chamber 11 and the external cassette elevator 16. A slit valve 50 constructed according to the present invention is mounted at each of the slits 42–46 for closing the associated slit to vacuum isolate the associated chamber(s) and for opening the slit to permit wafer transfer. The slit valve 50 in the chamber wall 21 between the loadlock 11 and the external cassette elevator 16 is mounted externally to the loadlock chamber, where characteristics such as low particulate generation are not quite so critical. However, the other four slit valves are mounted within and operate (open and close) within the loadlock chamber 11. As a result, low particulate generation, small size and reliability are very critical, particularly since the described system 10 is a compact, high throughput, single wafer processing system which is designed to process particulate sensitive LSI, VLSI and ULSI (ultra large scale integrated circuit) wafers.

2. Construction of Slit Valve Mechanism 50

My slit valve 50 which has the compactness, low particulate characteristics, simplicity, high reliability and ease of maintenance which are required by the above multi-chamber integrated circuit processing system 10, is depicted in greater detail in FIGS. 2–4. FIG. 2 is a top plan view of my slit valve 50, depicted in use in the vacuum processing system 10 of FIG. 1, while FIG. 3 is a vertical cross-section taken along lines 3—3 in FIG. 2 showing the slit valve 50 in the closed position and FIG. 4 is another vertical cross-section showing the slit valve in the open position.

For convenient reference, the slit valve 50 illustrated in FIGS. 2–4 is that which is mounted on the internal loadlock chamber wall 17 between the loadlock chamber 11 and the vacuum processing chamber 12. However, as mentioned above, it is understood that the particular slit valve represents the construction and operation of the other four slit valves. As mentioned, the purpose of the slit valve 50 is to cover the slit 42 in the wall 17 with a vacuum-tight seal to permit vacuum processing in the chamber 12 (or in the loadlock chamber 11).

Referring primarily to FIGS. 2 and 3, the slit valve mechanism 50 comprises a valve body or door 51 and a pair of brackets 52 which are mounted by screws or bolts 53 near opposite sides of and directly beneath the access slit 42. Each bracket 52 has an elongated slot 54, which typically is oriented with the long axis transverse to (perpendicular to or at a large acute angle to) the wall 17, for receiving a rod 56, on which the valve body 51 is pivotally retained by washers 57 and retainer nuts 58. An O-ring 59 is mounted in a mating slot in the side of the body 51 adjacent the wall 17 for providing a vacuum-tight seal around the slot 42. As discussed below, the construction of the slit valve mechanism provides even sealing, both top-to-bottom and left-to-right (side-to-side). Torsion bar coil spring 61 is mounted on the rod 56, and has one end thereof retained in a mating receiving slot in bracket 52 and the opposite end retained in a slot in a valve body 51, for biasing the valve body into the normally open position shown in FIG. 4 and against cam followers 64 and 65. Perferably, a spring(s) 60 shown schematically in FIG. 2 is operatively connected to the valve body 51 to bias the body away from the wall 17, that is, to bias the rod 56 to the outside end of slot 54.

Referring particularly to FIG. 3, the valve body 51 is closed by a pneumatic cylinder or actuator 63 which pivots two eccentric cam followers 64 and 65 against cam blocks 66 and 67 mounted one each on opposite ends of the valve body 51 on the side thereof opposite the wall. Specifically, the double action pneumatic cylinder actuator 63 is pivotally mounted via rod 68 to a bracket 69 which, in turn, is mounted to the bottom edge of the sidewalls 75 and 76 (FIG. 2) of an open-bottom housing 77. The housing 77 is mounted to the loadlock base plate 70 by a pair of screws 88 (FIG. 2) using an O-ring sealing member 89 mounted in a slot on the bottom edge of the housing's side and end walls.

Reversible actuator rod 71 of the pneumatic cylinder 63 is pivotally connected at its outer end to one end of a crank arm 73. The crank arm's opposite end is affixed to shaft 74. The shaft 74 is rotatably journaled, using a conventional vacuum sealing mounting arrangement, to the opposite end walls 75 and 76 (FIG. 2) of the housing 77. Referring to FIGS. 2 and 3, one end of each swing arm 81 and 82 is affixed to one of the opposite ends 78 and 79 of the shaft 74, for rotation therewith. The swing arms 81 and 82 carry small pivot shafts 83 and 84 on which the eccentric cam follower wheels 64 and 65 are rotatably mounted.

The described actuator mechanism comprising housing 77, air cylinder actuator 63, crank arm 73, shaft 74, swing arms 81 and 82 and cam followers 64 and 65 forms an integral structure which is easily mounted as a unit within hole 90 in the loadlock chamber base plate 70. The unit is attached to the base plate using the screws 88 (FIG. 2). The housing 77 isolates the just described valve actuator structure, with the exception of the swing arms and cam followers, outside the vacuum loadlock chamber 11.

In summary, the valve body 51 is mounted for rotation of pivot shaft 56 which is biased to the outer end of mounting slot 54 by a spring such as 60. The valve body 51 is also biased to the normally open position shown in FIG. 4 by spring 61. Cam followers 64 and 65 are mounted on swing arms 81 and 82, which in turn are mounted on solid shaft 74, and are rotated together on the shaft by actuator 63 and connecting crank arm 73 to pivot the cam followers through an arc of about 30° for closing and opening the slit valve body 51.

3. Operation of Slit Vavle Mechanism 50

In considering the operation of the slit valve mechanism in more detail, consider first the closing movement, starting with the slit valve body 51 in the open position which is shown in FIG. 4. Here, the cylinder rod 71 is initially retracted so that the swing arms 81 and 82 and cam followers 64 and 65 are in the downward (open) position.

To close the slit valve body 51, air under pressure is applied to inlet 91 of the pneumatic cylinder 63 to extend rod 71 upward, pivoting crank arm 73 clockwise and thereby also pivoting the associated swing arms 81 and 82 clockwise from the bottom or open position shown in FIG. 4 to the upper (closed) position shown in FIG. 3. The clockwise pivoting of the swing arms 81 and 82 causes the eccentric cam followers 64 and 65 to engage the angled surfaces 86 and 87 of the cam block 66 and 67 and to rotate the slit valve 51 counterclockwise to the closed vertical position shown in FIG. 3, compressing the O-ring 59 slightly against the wall. The rotating force of the swing arms 81 and 82 overcomes the outward biasing of shaft 56 and during the final phase of the closing rotation of the cam followers 64 and 65, the pivot piont of shaft 56 is moved linearly within the slots 54 toward the wall 17, thereby compressing the O-ring 59 evenly, top-to-bottom. Thus, this construction and operation provides even compression and secure sealing top-to-bottom despite the rotating closing movement, and also precludes sliding or rubbing motion of the O-ring 59 against the wall 17.

Referring to FIG. 3, in the fully closed position of valve body 51, the angle $\theta$ defined by the axis of the swing arm 81 (82) and the plane of the cam follower surface 86 (87) is slightly smaller than 90° and, as a consequence, the cam block 66 (67) and swing arm 81 (82) are locked together and the valve body is resiliently sealed against the wall 17 via the intervening O-ring 59. As a consequence of this cooperative locking relationship, slit valve 51 remains locked in the closed position, even in the event of a power failure.

Another advantage results from the use of the eccentered cam followers 64 and 65, which adjust the compressive force exerted by the slit valve body 51 against the O-ring 59 and compensate for any left and right discrepancies in the O-ring compression values. In short, the biased mounting of shaft 56 in slot 54 and the eccentered cam followers 64 and 65 cooperatively compensate for top-to-bottom and side-to-side discrepancies in sealing compression values and/or valve closure operation and provide even top-to-bottom and side-to-side sealing.

The slit valve 51 is opened by applying air under pressure to the cylinder via second inlet 92 to retract the cylinder rod 71 and pivot the crank arm 73 counterclockwise, thereby pivoting swing arms 81 and 82 and associated cam followers 64 and 65 counterclockwise. This allows the coil biasing spring 61 to pivot the slit valve body 51 clockwise to the open position shown in FIG. 4. Spring 60 returns the body 51 towards the outer edge of slots 54.

The use of the described double action air cylinder is exemplary only, for other types of air cylinders and in fact other types of actuating means such as, for example, electromagnet-controlled or solenoid-type reciprocating control rods 71 can be used.

Those of usual skill in the art will understand that components other than those described here can be used. For example, the invention is certainly not limited to the use of pneumatic cylinders; electromagnetic-operated cylinders can be used.

Thus, there has been described a slit valve mechanism which achieves the stated goals of simplicity, compactness, high reliability and low cost.

Simplicity and low cost are reflected in the use of only a relatively few major components—the actuator means 63, crank 73, pivot arms 81 and 82 with cam followers 64 and 65 and slit valve body 51 with cam blocks 66 and 67—to achieve the combination of compact physical size, compact opening and closing movement, fail-safe locking, and the elimination of sliding surface-to-surface contact, all without complicated gear systems or other complicated device mechanisms.

Compactness is achieved by the use of the narrow (short) slit 42, the simple pivotal opening and closing movement of the short slit valve body 51 which takes up very little loadlock floor space in the open position, and the intrusion of only the slit valve body 51 and swing arms 81 and 82 and associated cam followers 64 and 65 into the loadlock chamber.

High reliability is provided in part by the simple mechanical movements described above, the relatively few number of parts, the automatic opening when the swing arms are retracted and the fail-safe locking.

Low particulate generation results from isolation of the drive means outside the loadlock chamber, the presence of only pivotal surface-to-surface contact within the loadlock chamber and the elimination of sliding friction in sealing the slit valve body 51 to the wall 17.

Ease of attachment and of removal are provided by the simple mounting arrangement of the valve body 51 and the associated integral actuator mechanism.

Also, the above-described design can be scaled to larger or smaller sizes as required.

Having thus described preferred and alternative embodiments of my present invention, those of usual skill in the art will readily derive additional modifications and variations which are within the scope of the appended claims.

What is claimed is:

1. A slit valve mechanism for selectively closing an opening in a wall, comprising:

a slit valve body pivotally mounted on the wall adjacent said opening for selectively closing said opening;

means connected to the slit valve body for biasing the slit valve body normally open;

means for closing the slit valve body comprising at least one cam block mounted on the side of the slit valve body opposite said wall and having a camming surface; a swing arm having a cam follower on one end thereof, said swing arm being mounted for pivotal movement in first and second directions for engaging the cam follower against the cam block during movement in the first direction to cam the slit valve body closed and for releasing the camming force during movement in the second direction to permit the biasing means to open the slit valve body; and actuator means connected to said swing arm for reciprocally pivoting said swing arm.

2. The slit valve mechanism of claim 1, the slit valve body having a sealing member therein on the side thereof facing the wall for forming a seal between the wall and body about the periphery of the opening; said closing means comprising a pair of cam blocks and associated cam followers located at spaced positions along said valve body; and said cam followers being eccentric rollers for compensating unequal side-to-side compressive sealing.

3. The slit valve mechanism of claim 1 or 2, the swing arm being oriented such that the included angle between the swing arm and camming surface in the closed second position is <90° for locking the swing arm and cam block in position.

4. The slit valve mechanism of claim 1 or 2, further comprising:
bracket means mounted adjacent the opening and rotatably mounting a shaft extending generally parallel to the opening, the slit valve body being mounted on the shaft for said pivotal opening and closing movement.

5. The slit valve mechanism of claim 4, the swing arm being oriented such that the included angle between the swing arm and the camming surface in the closed second position is <90° for locking the swing arm and cam block in position.

6. The slit valve mechanism of claim 2, further comprising:
bracket means mounted adjacent the opening and having slot means oriented transverse to the wall and rotatably mounting a shaft extending generally parallel to the opening, the body being mounted on the shaft for said pivotal opening and closing movement; and
biasing means connected to the slit valve body for normally positioning the body toward the outside edge of slot means, whereby closing movement of the cam follower in the first direction overcomes the spring biasing and linearly moves the slit valve body inwardly along the slot means and against the wall, thereby providing equalized top-to-bottom compression of the body against the wall.

7. The slit valve mechanism of claim 6, the swing arm being oriented such that the included angle between the swing arm and the camming surface in the closed second position is <90° for locking the swing arm and cam block in position.

8. The slit valve mechanism of claim 1, 2 or 6, the actuator means comprising a cylinder having an extendible rod and a crank pivotally connected at one end to the rod and adaptively connected at an opposite end to the swing arm for reversibly pivoting the swing arm in said first and second directions in response to extension and retraction of the rod.

9. A slit valve mechanism for selectively closing an opening in a vacuum chamber wall, comprising:
bracket means comprising a pair of brackets mounted adjacent the opening proximate opposite ends thereof, each bracket having a slot therein oriented transverse to the plane of the chamber wall for cooperatively mounting a rotatable shaft generally parallel to the opening;
a slit valve body mounted on the shaft for pivotal movement therewith to open and close the opening, the slit valve body having a sealing member on the side thereof facing the wall for forming a seal between the wall and body about the periphery of said opening;
biasing means operatively connected to the slit valve body for biasing the body normally open;
means for closing the slit valve body comprising at least one cam block mounted on the side of the body opposite the wall and having a camming surface; a rotatable shaft; a swing arm mounted on the shaft for rotation and carrying an eccentric cam follower roller on the end thereof opposite the shaft; actuator means for reciprocally rotating the shaft and the swing arm in first and second directions for engaging the cam block during movement in the first direction to cam the slit valve body closed over the opening and for releasing from the cam block during movement in the second direction to permit the biasing spring to open said slit valve body; and
biasing means connected to the slit valve body for biasing the body toward the outside edge of the elongated slot, whereby closing movement of the cam follower in the first direction overcomes the biasing action and resiliently moves said slit valve body linearly inwardly along the slot and against the wall;
whereby said eccentric cam follower rollers and linear shaft movement provide equalized end-to-end and top-to-bottom compression sealing values.

10. The slit valve mechanism of claim 9, the actuator means comprising a cylinder having an extendible rod; and a crank pivotally connected at one end to the extendible rod and connected at an opposite end to the rotatable shaft for reversibly rotating the shaft due to extension and retraction of the rod.

11. The slit valve mechanism of claim 9 or 10, the swing arm being oriented such that the included angle between the swing arm and the camming surface in the closed second position is <90° for locking the swing arm and cam block in position.

* * * * *